's011156869B1

United States Patent
Qiu

(10) Patent No.: US 11,156,869 B1
(45) Date of Patent: Oct. 26, 2021

(54) BACKLIGHT STRUCTURE AND DISPLAY PANEL

(71) Applicant: Huizhou China Star Optoelectronics Technology Co., Ltd., Huizhou (CN)

(72) Inventor: Yongyuan Qiu, Huizhou (CN)

(73) Assignee: Huizhou China Star Optoelectronics Technology Co., Ltd., Huizhou (CN)

( * ) Notice: Subject to any disclaimer, the term of this patent is extended or adjusted under 35 U.S.C. 154(b) by 228 days.

(21) Appl. No.: 16/614,361

(22) PCT Filed: Sep. 19, 2019

(86) PCT No.: PCT/CN2019/106562
§ 371 (c)(1),
(2) Date: Nov. 17, 2019

(87) PCT Pub. No.: WO2020/237918
PCT Pub. Date: Dec. 3, 2020

(30) Foreign Application Priority Data

May 29, 2019 (CN) .......................... 201910455356.7

(51) Int. Cl.
*G02F 1/13357* (2006.01)
*G02F 1/1335* (2006.01)

(52) U.S. Cl.
CPC .. *G02F 1/133603* (2013.01); *G02F 1/133605* (2013.01); *G02F 1/133607* (2021.01); *G02F 1/133608* (2013.01)

(58) Field of Classification Search
CPC ......... G02F 1/133603; G02F 1/133608; G02F 1/133607; G02F 1/133605
See application file for complete search history.

(56) References Cited

U.S. PATENT DOCUMENTS

| | | | |
|---|---|---|---|
| 8,537,100 B2* | 9/2013 | Fang | G02B 6/0055 345/102 |
| 10,613,381 B2* | 4/2020 | Fu | G02F 1/133605 |
| 10,775,535 B2* | 9/2020 | Fu | G02F 1/1335 |
| 11,092,847 B2* | 8/2021 | Huang | G02F 1/133607 |
| 2016/0147106 A1* | 5/2016 | Kim | G02B 6/0086 349/58 |
| 2019/0196092 A1* | 6/2019 | Tang | G02B 6/009 |
| 2019/0369408 A1* | 12/2019 | Liu | G02B 6/0043 |
| 2021/0167263 A1* | 6/2021 | Yamada | H01L 33/54 |
| 2021/0215973 A1* | 7/2021 | Wang | G02F 1/133607 |

* cited by examiner

*Primary Examiner* — Tracie Y Green

(57) ABSTRACT

A backlight structure and a display panel. The backlight structure includes a backlight source, a first optical film and a second optical film. The backlight source includes a plurality of sub-millimeter light emitting diodes disposed on the lamp panel. The first optical film includes a first surface having a plurality of first light diffusing structures and a second surface having a plurality of first supporting reflective structures. Projections of the plurality of first light diffusing structures on the light panel separates from projections of the plurality of first supporting reflective structures on the light panel.

20 Claims, 1 Drawing Sheet

BACKLIGHT STRUCTURE AND DISPLAY PANEL

RELATED APPLICATIONS

This application is a National Phase of PCT Patent Application No. PCT/CN2019/106562 having International filing date of Sep. 19, 2019, which claims the benefit of priority of Chinese Patent Application No. 201910455356.7 filed on May 29, 2019. The contents of the above applications are all incorporated by reference as if fully set forth herein in their entirety.

FIELD AND BACKGROUND OF THE INVENTION

The present invention relates to the field of display technologies, and in particular, to a backlight structure and a display panel.

Sub-millimeter light-emitting diodes (mini-LED) greatly reduce the size of a backlight source in a liquid crystal panel so that the size of backlight units can be less than 100 micrometers and the backlight sources can be thinned, miniaturized, and arrayed. Each pixel of a liquid crystal panel using the mini-LEDs can be addressed and driven individually.

With the development of mini-LEDs, backlight structures of liquid crystal panels have undergone great changes. In order to realize thinning of display panel and to meet the user's demand for multiple partitions of display panel, it is necessary to remove diffusion plates in a backlight structure of a mini-LED, so that optical films can be close to or even directly attached to the mini-LEDs. Therefore, how to ensure light mixing effect of backlight sources while omitting the diffusion plate has become an urgent problem to be solved.

SUMMARY OF THE INVENTION

The application provides a backlight structure and a display panel, which can optimize light mixing effect of mini-LED light panel.

To solve the above problems, the present application provides a backlight structure, and the backlight structure includes:

a backlight source comprising a plurality of sub-millimeter light emitting diodes disposed on a light panel;

a first optical film disposed above the backlight source;

a second optical film disposed above the first optical film;

wherein the first optical film comprises a first surface adjacent to the backlight source and a second surface away from the backlight source, the first surface has a plurality of first light diffusion structures, and the second surface has a plurality of first supporting reflective structures, the plurality of first light diffusing structures are spaced apart from the plurality of first supporting reflective structures;

wherein projections of the plurality of first light diffusion structures on the light panel separate from projections of the plurality of first support reflection structures on the light panel.

According to one aspect of the application, wherein the plurality of first light diffusion structures and the plurality of sub-millimeter light emitting diodes are correspondingly disposed, each of the sub-millimeter light emitting diodes is located at a geometric center of a projection of a first light diffusing structure corresponding to the sub-millimeter light emitting diode on the light panel.

According to one aspect of the application, wherein each of the first light diffusing structures corresponds to a light diffusion range including a plurality of first boundaries, a line connecting the sub-millimeter light emitting diode and any point on a boundary of the first light diffusing structure corresponding to the sub-millimeter light emitting diode constitutes a first boundary, an angle between the first boundary and a vertical direction is greater than or equal to 30 degrees.

According to one aspect of the application, wherein a cross section of the plurality of first supporting reflection structures in a direction perpendicular to a surface of the first optical film is a triangle;

wherein a first side of the triangle is parallel to a first boundary that is closest to the first side, a second side of the triangle is parallel to another first boundary that is closest to the second side.

According to one aspect of the application, wherein a surface of the plurality of first supporting reflective structures has a reflective coating, and a surface of the reflective coating is a mirror structure.

According to one aspect of the application, wherein the second optical film comprises a third surface close to the backlight source and a fourth surface away from the backlight source, the third surface having a plurality of second light diffusion structures.

According to one aspect of the application, wherein the plurality of second light diffusion structures and the plurality of first light diffusion structures are correspondingly disposed;

wherein a geometric center of a projection of the first light diffusing structure on the light panel overlaps with a geometric center of a projection of the second light diffusing structure corresponding to the first light diffusing structure on the light panel;

wherein a boundary of each of the second light diffusion structures is located on an extension line of the first boundary of the first light diffusion structure disposed corresponding to the second light diffusion structure.

According to one aspect of the application, wherein the backlight structure further comprises a plurality of second supporting reflective structures on the fourth surface, a projection of the plurality of second light diffusing structures on the light panel separates from a projection of the plurality of second supporting reflective structures on the light panel.

According to one aspect of the application, wherein the backlight structure further comprises a third optical film disposed above the second optical film, the third optical film comprises a fifth surface close to the backlight source and a sixth surface away from the backlight source, the fifth surface has a plurality of third light diffusion structures, and the plurality of third light diffusion structures and the plurality of first light diffusion structures are correspondingly disposed;

wherein, a geometric center of a projection of the corresponding first light diffusion structure on the light panel overlaps with a geometric center of a projection of the third light diffusion structure on the light panel;

a boundary of each of the third light diffusion structures is located on an extension line of the first boundary of the first light diffusion structure disposed corresponding to the third light diffusion structure.

According to one aspect of the application, wherein the backlight structure further comprises a microlens array under the first optical film.

According to one aspect of the application, wherein the microlens array comprises a support plate including a seventh surface close to the backlight source and an eighth surface away from the backlight source, the seventh surface has a plurality of light incident structures, and the eighth surface has a plurality of light emitting structures corresponding to the plurality of light incident structures, the plurality of light incident structures and the plurality of light emitting structures corresponding to the plurality of light incident structures constitute a plurality of microlens structures;

wherein the plurality of light incident structures are roll-formed on the seventh surface by a first mold and the plurality of light emitting structures are roll-formed on the eighth surface by a second mold.

The present application further provides a display panel comprising a backlight structure, wherein the backlight structure comprises:

a backlight source comprising a plurality of sub-millimeter light emitting diodes disposed on a light panel;

a first optical film disposed above the backlight source;

a second optical film disposed above the first optical film;

wherein the first optical film comprises a first surface adjacent to the backlight source and a second surface away from the backlight source, the first surface has a plurality of first light diffusion structures, and the second surface has a plurality of first supporting reflective structures, the plurality of first light diffusing structures are spaced apart from the plurality of first supporting reflective structures;

wherein projections of the plurality of first light diffusion structures on the light panel separate from projections of the plurality of first support reflection structures on the light panel.

According to one aspect of the application, wherein the plurality of first light diffusion structures and the plurality of sub-millimeter light emitting diodes are correspondingly disposed, each of the sub-millimeter light emitting diodes is located at a geometric center of a projection of a first light diffusing structure corresponding to the sub-millimeter light emitting diode on the light panel.

According to one aspect of the application, wherein each of the first light diffusing structures corresponds to a light diffusion range including a plurality of first boundaries, a line connecting the sub-millimeter light emitting diode and any point on a boundary of the first light diffusing structure corresponding to the sub-millimeter light emitting diode constitutes a first boundary, an angle between the first boundary and a vertical direction is greater than or equal to 30 degrees.

According to one aspect of the application, wherein a cross section of the plurality of first supporting reflection structures in a direction perpendicular to a surface of the first optical film is a triangle;

wherein a first side of the triangle is parallel to a first boundary that is closest to the first side, a second side of the triangle is parallel to another first boundary that is closest to the second side.

According to one aspect of the application, wherein a surface of the plurality of first supporting reflective structures has a reflective coating, and a surface of the reflective coating is a mirror structure.

According to one aspect of the application, wherein the second optical film comprises a third surface close to the backlight source and a fourth surface away from the backlight source, the third surface having a plurality of second light diffusion structures.

According to one aspect of the application, wherein the plurality of second light diffusion structures and the plurality of first light diffusion structures are correspondingly disposed;

wherein a geometric center of a projection of the first light diffusing structure on the light panel overlaps with a geometric center of a projection of the second light diffusing structure corresponding to the first light diffusing structure on the light panel;

wherein a boundary of each of the second light diffusion structures is located on an extension line of the first boundary of the first light diffusion structure disposed corresponding to the second light diffusion structure.

According to one aspect of the application, wherein the backlight structure further comprises a plurality of second supporting reflective structures on the fourth surface, a projection of the plurality of second light diffusing structures on the light panel separates from a projection of the plurality of second supporting reflective structures on the light panel.

According to one aspect of the application, wherein the backlight structure further comprises a third optical film disposed above the second optical film, the third optical film comprises a fifth surface close to the backlight source and a sixth surface away from the backlight source, the fifth surface has a plurality of third light diffusion structures, and the plurality of third light diffusion structures and the plurality of first light diffusion structures are correspondingly disposed;

wherein, a geometric center of a projection of the corresponding first light diffusion structure on the light panel overlaps with a geometric center of a projection of the third light diffusion structure on the light panel;

a boundary of each of the third light diffusion structures is located on an extension line of the first boundary of the first light diffusion structure disposed corresponding to the third light diffusion structure.

The backlight structure of the present application includes a first optical film and a second optical film. The first optical film includes a first surface close to a backlight source and a second surface away from the backlight source. The first surface has a plurality of first light diffusing structures, the second surface has a plurality of first support reflective structures. The light diffusing structures can reduce brightness of light in a range of 60 degrees above mini-LEDs, thereby avoiding light distribution of the light generated by the mini-LED, and optimizing light mixing effect of the mini-LED. The first supporting reflective structure serves on the one hand to support the second optical film and on the other hand to reflect light incident on the first supporting reflective structure, reducing light loss.

DESCRIPTION OF SPECIFIC EMBODIMENTS OF THE INVENTION

Figure 1:
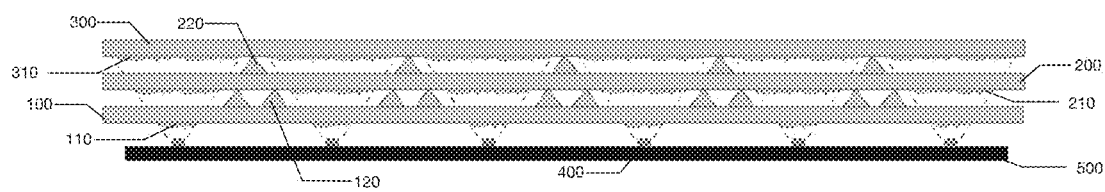
FIG. 1 is a structural diagram of a backlight structure in a specific embodiment of the present application.

Description of following embodiment, with reference to accompanying drawings, is used to exemplify specific embodiments which may be carried out in the present disclosure. Directional terms mentioned in the present disclosure, such as "top", "bottom", "front", "back", "left", "right", "inside", "outside", "side", etc., are only used with reference to orientation of the accompanying drawings. Therefore, the directional terms are intended to illustrate, but not to limit, the present disclosure. In the drawings, components having similar structures are denoted by same numerals.

The application provides a backlight structure and a display panel, which can optimize the light mixing effect of the mini-LED light panel. Referring to FIG. 1, FIG. 1 is a structural diagram of a backlight structure according to an embodiment of the present application. The backlight structure includes a backlight source, a first optical film 100 and a second optical film 200.

The backlight source includes a plurality of sub-millimeter light emitting diodes 400 disposed on a light panel 500. Preferably, the backlight source comprises a plurality of light panels 500, the light panel 500 is a strip light board, and the plurality of sub-millimeter light emitting diodes 400 are arranged in a strip shape in a first direction. The plurality of light panels 500 are arranged in a second direction, the second direction is perpendicular to the first direction.

In the present application, the first optical film 100 is located above the backlight source. Wherein the first optical film 100 includes a first surface adjacent to the backlight source and a second surface away from the backlight source, the first surface has a plurality of first light diffusion structures 110, and the second surface has a plurality of first supporting reflective structures 120, the plurality of first light diffusing structures 110 are spaced apart from the plurality of first supporting reflective structures 120.

The light diffusing structures can reduce brightness of light in a range of 60 degrees above mini-LEDs, thereby avoiding light distribution of the light generated by the mini-LED, and optimizing light mixing effect of the mini-LED. Surfaces of the plurality of first light diffusing structures 110 are provided with uneven structures, and the uneven structures can effectively disperse the propagation direction of the light emitted by the mini-LED, so that the light can be distributed in different directions. In the present application, the plurality of first light diffusing structures 110 may be formed by particle coating or imprinting.

In this embodiment, in order to prevent the plurality of first light diffusing structures 110 from blocking the light emitted by the sub-millimeter light emitting diode 400, projections of the plurality of first light diffusion structures 110 on the light panel 500 separate from projections of the plurality of first support reflection structures 120 on the light panel 500.

In this embodiment, in order to obtain the best light diffusion effect, the plurality of first light diffusion structures 110 and the plurality of sub-millimeter light emitting diodes 400 are correspondingly disposed, each of the sub-millimeter light emitting diodes 400 is located at a geometric center of a projection of a first light diffusing structure 110 corresponding to the sub-millimeter light emitting diode on the light panel 500.

In this embodiment, each of the first light diffusing structures 110 corresponds to a light diffusion range including a plurality of first boundaries, a line connecting the sub-millimeter light emitting diode 400 and any point on a boundary of the first light diffusing structure 110 corresponding to the sub-millimeter light emitting diode 400 constitutes a first boundary, an angle between the first boundary and a vertical direction is greater than or equal to 30 degrees.

In this embodiment, a cross section of the plurality of first supporting reflection structures 120 in a direction perpendicular to a surface of the first optical film 100 is a triangle. A first side of the triangle is parallel to a first boundary that is closest to the first side, a second side of the triangle is parallel to another first boundary that is closest to the second side.

In other embodiments of the present application, a cross section of the plurality of first supporting reflection structures 120 in a direction perpendicular to a surface of the first optical film 100 is a trapezoid. A first side waist of the trapezoid is parallel to a first boundary that is closest to the first waist, and the second side waist of the trapezoid is parallel to another first boundary that is closest to the first side waist.

In this embodiment, a surface of the plurality of first supporting reflective structures 120 has a reflective coating, and a surface of the reflective coating is a mirror structure. The reflective coating is capable of reflecting light incident on the first supporting reflective structure 120 above the first optical film, prevent the backlight light from being absorbed by the first supporting reflective structure 120 and improve the light utilization efficiency of the backlight source. The mirror structure can further enhance the reflection effect of the first support reflection structure 120.

In the present application, the second optical film 200 is located above the first optical film 100. The second optical film 200 comprises a third surface close to the backlight source and a fourth surface away from the backlight source, the third surface having a plurality of second light diffusion structures 210.

In this embodiment, the plurality of second light diffusion structures 210 and the plurality of first light diffusion structures 110 are correspondingly disposed. A geometric center of a projection of the first light diffusing structure 110 on the light panel 500 overlaps with a geometric center of a projection of the second light diffusing structure 210 corresponding to the first light diffusing structure on the light panel. A boundary of each of the second light diffusion structures is located on an extension line of the first boundary of the first light diffusion structure disposed corresponding to the second light diffusion structure.

A light diffusion range of the second light diffusion structure 210 is larger than a light diffusion range of the first light diffusion structure 110, and the light that penetrates the first optical film can be further optimized to achieve a better light mixing effect.

In this embodiment, in order to further optimize the light mixing effect, the backlight structure further includes a plurality of second supporting reflective structures on the fourth surface and a third optical film disposed above the second optical film.

A projection of the plurality of second light diffusing structures 210 on the light panel 500 separates from a projection of the plurality of second supporting reflective structures 220 on the light panel 500.

The third optical film 300 comprises a fifth surface close to the backlight source and a sixth surface away from the backlight source, the fifth surface has a plurality of third light diffusion structures 310, and the plurality of third light diffusion structures 310 and the plurality of first light diffusion structures 110 are correspondingly disposed. Wherein a geometric center of a projection of the corresponding first light diffusion structure 110 on the light panel 500 overlaps with a geometric center of a projection of the third light diffusion structure 310 on the light panel 500. A boundary of each of the third light diffusion structures 310 is located on an extension line of the first boundary of the first light diffusion structure 110 disposed corresponding to the third light diffusion structure 310.

Figure 2:
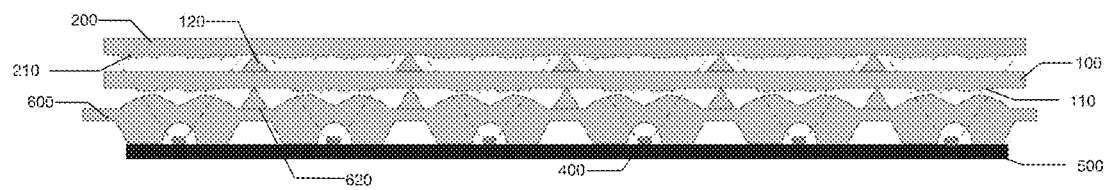
FIG. 2 is a structural diagram of a backlight structure in another embodiment of the present application.

Referring to FIG. 2, FIG. 2 is a schematic structural diagram of a backlight structure in another embodiment of the present application. In this embodiment, the backlight structure further includes a microlens array 600 under the first optical film 100. The microlens array 600 is isolated from the first optical film 100 by a third support reflective structure 620.

The microlens array includes a support plate including a seventh surface close to the backlight source and an eighth surface away from the backlight source, the seventh surface has a plurality of light incident structures, and the eighth surface has a plurality of light emitting structures corresponding to the plurality of light incident structures, the plurality of light incident structures and the plurality of light emitting structures corresponding to the plurality of light incident structures constitute a plurality of microlens structures. Wherein the plurality of light incident structures are roll-formed on the seventh surface by a first mold and the plurality of light emitting structures are roll-formed on the eighth surface by a second mold.

Correspondingly, the present application also provides a display panel comprising a backlight structure as described above.

The backlight structure of the present application includes a first optical film and a second optical film. The first optical film includes a first surface close to a backlight source and a second surface away from the backlight source. The first surface has a plurality of first light diffusing structures, the second surface has a plurality of first support reflective structures. The light diffusing structures can reduce brightness of light in a range of 60 degrees above mini-LEDs, thereby avoiding light distribution of the light generated by the mini-LED, and optimizing light mixing effect of the mini-LED. The first supporting reflective structure serves on the one hand to support the second optical film and on the other hand to reflect light incident on the first supporting reflective structure, reducing light loss.

As is understood by persons skilled in the art, the foregoing preferred embodiments of the present disclosure are illustrative rather than limiting of the present disclosure. It is intended that they cover various modifications and that similar arrangements be included in the spirit and scope of the present disclosure, the scope of which should be accorded the broadest interpretation so as to encompass all such modifications and similar structures.

What is claimed is:

1. A backlight structure, wherein the backlight structure comprises:
   a backlight source comprising a plurality of sub-millimeter light emitting diodes disposed on a light panel;
   a first optical film disposed above the backlight source;
   a second optical film disposed above the first optical film;
   wherein the first optical film comprises a first surface adjacent to the backlight source and a second surface away from the backlight source, the first surface has a plurality of first light diffusion structures, and the second surface has a plurality of first supporting reflective structures, the plurality of first light diffusing structures are spaced apart from the plurality of first supporting reflective structures;
   wherein projections of the plurality of first light diffusion structures on the light panel separate from projections of the plurality of first support reflection structures on the light panel.

2. The backlight structure according to claim 1, wherein the plurality of first light diffusion structures and the plurality of sub-millimeter light emitting diodes are correspondingly disposed, each of the sub-millimeter light emitting diodes is located at a geometric center of a projection of a first light diffusing structure corresponding to the sub-millimeter light emitting diode on the light panel.

3. The backlight structure according to claim 1, wherein each of the first light diffusing structures corresponds to a light diffusion range including a plurality of first boundaries, a line connecting the sub-millimeter light emitting diode and any point on a boundary of the first light diffusing structure corresponding to the sub-millimeter light emitting diode constitutes a first boundary, an angle between the first boundary and a vertical direction is greater than or equal to 30 degrees.

4. The backlight structure according to claim 3, wherein a cross section of the plurality of first supporting reflection structures in a direction perpendicular to a surface of the first optical film is a triangle;
   wherein a first side of the triangle is parallel to a first boundary that is closest to the first side, a second side of the triangle is parallel to another first boundary that is closest to the second side.

5. The backlight structure according to claim 4, wherein a surface of the plurality of first supporting reflective structures has a reflective coating, and a surface of the reflective coating is a mirror structure.

6. The backlight structure according to claim 5, wherein the second optical film comprises a third surface close to the backlight source and a fourth surface away from the backlight source, the third surface having a plurality of second light diffusion structures.

7. The backlight structure according to claim 6, wherein the plurality of second light diffusion structures and the plurality of first light diffusion structures are correspondingly disposed;
   wherein a geometric center of a projection of the first light diffusing structure on the light panel overlaps with a geometric center of a projection of the second light diffusing structure corresponding to the first light diffusing structure on the light panel;
   wherein a boundary of each of the second light diffusion structures is located on an extension line of the first boundary of the first light diffusion structure disposed corresponding to the second light diffusion structure.

8. The backlight structure according to claim 7, wherein the backlight structure further comprises a plurality of second supporting reflective structures on the fourth surface, a projection of the plurality of second light diffusing structures on the light panel separates from a projection of the plurality of second supporting reflective structures on the light panel.

9. The backlight structure according to claim 8, wherein the backlight structure further comprises a third optical film disposed above the second optical film, the third optical film comprises a fifth surface close to the backlight source and a sixth surface away from the backlight source, the fifth surface has a plurality of third light diffusion structures, and the plurality of third light diffusion structures and the plurality of first light diffusion structures are correspondingly disposed;
   wherein, a geometric center of a projection of the corresponding first light diffusion structure on the light panel overlaps with a geometric center of a projection of the third light diffusion structure on the light panel;

a boundary of each of the third light diffusion structures is located on an extension line of the first boundary of the first light diffusion structure disposed corresponding to the third light diffusion structure.

10. The backlight structure according to claim 1, wherein the backlight structure further comprises a microlens array under the first optical film.

11. The backlight structure according to claim 10, wherein the microlens array comprises a support plate including a seventh surface close to the backlight source and an eighth surface away from the backlight source, the seventh surface has a plurality of light incident structures, and the eighth surface has a plurality of light emitting structures corresponding to the plurality of light incident structures, the plurality of light incident structures and the plurality of light emitting structures corresponding to the plurality of light incident structures constitute a plurality of microlens structures;
  wherein the plurality of light incident structures are roll-formed on the seventh surface by a first mold and the plurality of light emitting structures are roll-formed on the eighth surface by a second mold.

12. A display panel comprising a backlight structure, wherein the backlight structure comprises:
  a backlight source comprising a plurality of sub-millimeter light emitting diodes disposed on a light panel;
  a first optical film disposed above the backlight source;
  a second optical film disposed above the first optical film;
  wherein the first optical film comprises a first surface adjacent to the backlight source and a second surface away from the backlight source, the first surface has a plurality of first light diffusion structures, and the second surface has a plurality of first supporting reflective structures, the plurality of first light diffusing structures are spaced apart from the plurality of first supporting reflective structures;
  wherein projections of the plurality of first light diffusion structures on the light panel separate from projections of the plurality of first support reflection structures on the light panel.

13. The display panel according to claim 12, wherein the plurality of first light diffusion structures and the plurality of sub-millimeter light emitting diodes are correspondingly disposed, each of the sub-millimeter light emitting diodes is located at a geometric center of a projection of a first light diffusing structure corresponding to the sub-millimeter light emitting diode on the light panel.

14. The display panel according to claim 12, wherein each of the first light diffusing structures corresponds to a light diffusion range including a plurality of first boundaries, a line connecting the sub-millimeter light emitting diode and any point on a boundary of the first light diffusing structure corresponding to the sub-millimeter light emitting diode constitutes a first boundary, an angle between the first boundary and a vertical direction is greater than or equal to 30 degrees.

15. The display panel according to claim 14, wherein a cross section of the plurality of first supporting reflection structures in a direction perpendicular to a surface of the first optical film is a triangle;
  wherein a first side of the triangle is parallel to a first boundary that is closest to the first side, a second side of the triangle is parallel to another first boundary that is closest to the second side.

16. The display panel according to claim 15, wherein a surface of the plurality of first supporting reflective structures has a reflective coating, and a surface of the reflective coating is a mirror structure.

17. The display panel according to claim 16, wherein the second optical film comprises a third surface close to the backlight source and a fourth surface away from the backlight source, the third surface having a plurality of second light diffusion structures.

18. The display panel according to claim 17, wherein the plurality of second light diffusion structures and the plurality of first light diffusion structures are correspondingly disposed;
  wherein a geometric center of a projection of the first light diffusing structure on the light panel overlaps with a geometric center of a projection of the second light diffusing structure corresponding to the first light diffusing structure on the light panel;
  wherein a boundary of each of the second light diffusion structures is located on an extension line of the first boundary of the first light diffusion structure disposed corresponding to the second light diffusion structure.

19. The display panel according to claim 18, wherein the backlight structure further comprises a plurality of second supporting reflective structures on the fourth surface, a projection of the plurality of second light diffusing structures on the light panel separates from a projection of the plurality of second supporting reflective structures on the light panel.

20. The display panel according to claim 19, wherein the backlight structure further comprises a third optical film disposed above the second optical film, the third optical film comprises a fifth surface close to the backlight source and a sixth surface away from the backlight source, the fifth surface has a plurality of third light diffusion structures, and the plurality of third light diffusion structures and the plurality of first light diffusion structures are correspondingly disposed;
  wherein, a geometric center of a projection of the corresponding first light diffusion structure on the light panel overlaps with a geometric center of a projection of the third light diffusion structure on the light panel;
  a boundary of each of the third light diffusion structures is located on an extension line of the first boundary of the first light diffusion structure disposed corresponding to the third light diffusion structure.

* * * * *